US006611563B1

(12) United States Patent
Davis et al.

(10) Patent No.: US 6,611,563 B1
(45) Date of Patent: Aug. 26, 2003

(54) SYSTEMS, METHODS AND COMPUTER PROGRAM PRODUCTS FOR DATA MODE REFINEMENT OF MODEM CONSTELLATION POINTS

(75) Inventors: Gordon Taylor Davis, Chapel Hill, NC (US); Ajay Dholakia, Gattikon (CH); Malcolm Scott Ware, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,799

(22) Filed: Oct. 29, 1999

(51) Int. Cl.$^7$ .............................................. H04B 14/04
(52) U.S. Cl. ...................................... 375/242; 375/222
(58) Field of Search ................. 375/222, 242, 375/295, 219, 229; 341/106

(56) References Cited

U.S. PATENT DOCUMENTS

| 3,557,308 A | 1/1971 | Alexander et al. ......... 178/69.5 |
| 3,622,877 A | 11/1971 | MacDavid et al. ....... 324/73 R |
| 3,683,120 A | 8/1972 | Schenkel .................. 179/15 A |
| 3,729,717 A | 4/1973 | de Koe et al. ........... 340/172.5 |
| 4,112,427 A | 9/1978 | Hofer et al. ................ 340/347 |
| 4,132,242 A | 1/1979 | Carroll, Jr. .................. 137/263 |
| 4,208,630 A | 6/1980 | Martinez ....................... 375/7 |
| 4,237,552 A | 12/1980 | Aikoh et al. .................. 370/83 |
| 4,270,027 A | 5/1981 | Agrawal et al. .......... 179/81 R |
| 4,434,322 A | 2/1984 | Ferrell ..................... 178/22.13 |
| 4,450,556 A | 5/1984 | Boleda et al. ................ 370/58 |
| 4,577,310 A | 3/1986 | Korsky et al. ................ 370/58 |
| 4,578,796 A | 3/1986 | Charalambous et al. ....... 375/8 |
| 4,720,861 A | 1/1988 | Bertrand ....................... 381/36 |
| 4,731,816 A | 3/1988 | Hughes-Hartogs ........... 379/98 |
| 4,756,007 A | 7/1988 | Qureshi et al. ................ 375/37 |
| 4,760,598 A | 7/1988 | Ferrell ......................... 380/44 |

(List continued on next page.)

FOREIGN PATENT DOCUMENTS

| EP | 0 473 116 A2 | 8/1991 | ............. H04N/1/00 |
| EP | 0 659 007 A2 | 11/1994 | .......... H04M/11/06 |
| EP | 0 669 740 A2 | 12/1994 | ........... H04L/27/00 |
| FR | 2 345 019 | 3/1976 | ........... H04L/27/10 |
| WO | WO 96/18261 | 6/1996 | .......... H04M/11/00 |
| WO | WO 98/37657 | 8/1998 | |

OTHER PUBLICATIONS

Erup, et al., *Interpolation in Digital Modems—Part II: Implementation and Performance*, IEEE Transactions on Communications, vol. 41, No. 6, pp. 998–1008 (Jun. 1993).
Fischer, *Signal Mapping for PCM Modems, V–pcm Rapporteur Meeting*, Sunriver, Oregon, USA, , 5 pgs. (Sep. 4–12, 1997).

*Primary Examiner*—Stephen Chin
*Assistant Examiner*—Curtis Odom
(74) *Attorney, Agent, or Firm*—Myers, Bigel, Sibley & Sajovec, P.A.; Scott W. Reid

(57) ABSTRACT

Methods, systems and computer program products are provided for refining constellation values in a Pulse Code Modulated (PCM) code point sequence of a PCM modem by averaging received levels associated with received symbols for a code point of interest received during data mode operation of the PCM modem so as to provide an average received level for the code point of interest and revising a constellation value corresponding to the code point of interest in the PCM code sequence based on the average received level for the code point of interest so as to provide a refined constellation value. Preferably, the averaging is performed by detecting that a symbol corresponding to the code point of interest has been received by the PCM modem and incorporating the received level of the symbol into a running sum of previously received levels for the symbol. If a predefined number of received levels have been incorporated into the running sum then the running sum is divided by the predefined number of receive levels. It is also preferred that, after determining the sum for the code point of interest, the running sum is set to zero and a new code point selected as the code point of interest.

42 Claims, 6 Drawing Sheets

U.S. PATENT DOCUMENTS

| | | | |
|---|---|---|---|
| 4,797,898 A | 1/1989 | Martinez | 375/7 |
| 4,833,706 A | 5/1989 | Hughes-Hartogs | 379/98 |
| 4,868,863 A | 9/1989 | Hartley et al. | 379/98 |
| 4,884,285 A | 11/1989 | Heynen et al. | 375/25 |
| 4,890,303 A | 12/1989 | Bader | 375/107 |
| 4,890,316 A | 12/1989 | Walsh et al. | 379/98 |
| 4,894,847 A | 1/1990 | Tjahjadi et al. | 375/121 |
| 4,901,333 A | 2/1990 | Hodgkiss | 375/98 |
| 4,943,980 A | 7/1990 | Dobson et al. | 375/42 |
| 4,953,210 A | 8/1990 | McGlynn et al. | 380/48 |
| 4,967,413 A | 10/1990 | Otani | 371/37.4 |
| 4,972,360 A | 11/1990 | Cuckier et al. | 364/724.04 |
| 4,985,902 A | 1/1991 | Gurcan | 375/14 |
| 4,991,169 A | 2/1991 | Davis et al. | 370/77 |
| 4,995,030 A | 2/1991 | Helf | 370/32.1 |
| 5,005,144 A | 4/1991 | Nakajima et al. | 364/565 |
| 5,007,047 A | 4/1991 | Sridhar et al. | 370/32.1 |
| 5,014,299 A | 5/1991 | Klupt et al. | 379/98 |
| 5,033,062 A | 7/1991 | Morrow et al. | 375/7 |
| 5,038,365 A | 8/1991 | Belloc et al. | 375/8 |
| 5,040,190 A | 8/1991 | Smith et al. | 375/4 |
| 5,052,000 A | 9/1991 | Wang et al. | 371/43 |
| 5,058,134 A | 10/1991 | Chevillat et al. | 375/39 |
| 5,065,410 A | 11/1991 | Yoshida et al. | 375/98 |
| 5,067,125 A | 11/1991 | Tsuchida | 370/79 |
| 5,068,875 A | 11/1991 | Quintin | 375/78 |
| 5,107,520 A | 4/1992 | Karam et al. | 375/60 |
| 5,111,481 A | 5/1992 | Chen et al. | 375/14 |
| 5,119,401 A | 6/1992 | Tsujimoto | 375/14 |
| 5,119,403 A | 6/1992 | Krishnan | 375/39 |
| 5,134,611 A | 7/1992 | Steinka et al. | 370/79 |
| 5,142,552 A | 8/1992 | Tzeng et al. | 375/14 |
| 5,157,690 A | 10/1992 | Buttle | 375/14 |
| 5,187,732 A | 2/1993 | Suzuki | 379/53 |
| 5,210,755 A | 5/1993 | Nagler et al. | 370/108 |
| 5,225,997 A | 7/1993 | Lederer et al. | 364/550 |
| 5,253,272 A | 10/1993 | Jaeger et al. | 375/60 |
| 5,253,291 A | 10/1993 | Naseer et al. | 379/406 |
| 5,265,151 A | 11/1993 | Goldstein | 379/97 |
| 5,285,474 A | 2/1994 | Chow et al. | 375/13 |
| 5,291,479 A | 3/1994 | Vaziri et al. | 370/58.2 |
| 5,311,578 A | 5/1994 | Bremer et al. | 379/97 |
| 5,317,594 A | 5/1994 | Goldstein | 375/8 |
| 5,351,134 A | 9/1994 | Yaguchi et al. | 358/435 |
| 5,353,280 A | 10/1994 | Ungerböck | 370/32.1 |
| 5,386,438 A | 1/1995 | England | 375/121 |
| 5,394,110 A | 2/1995 | Mizoguchi | 329/304 |
| 5,394,437 A | 2/1995 | Ayanoglu et al. | 375/222 |
| 5,398,303 A | 3/1995 | Tanaka | 395/51 |
| 5,402,445 A | 3/1995 | Matsuura | 375/229 |
| 5,406,583 A | 4/1995 | Dagdeviren | 375/5 |
| 5,418,842 A | 5/1995 | Cooper | 379/98 |
| 5,432,794 A | 7/1995 | Yaguchi | 371/5.5 |
| 5,434,884 A | 7/1995 | Rushing et al. | 375/235 |
| 5,475,711 A | 12/1995 | Betts et al. | 375/240 |
| 5,491,720 A | 2/1996 | Davis et al. | 375/222 |
| 5,513,216 A | 4/1996 | Gadot et al. | 375/233 |
| 5,519,703 A | 5/1996 | Chauffour et al. | 370/84 |
| 5,528,625 A | 6/1996 | Ayanoglu et al. | 375/222 |
| 5,528,679 A | 6/1996 | Taarud | 379/34 |
| 5,533,048 A | 7/1996 | Dolan | 375/222 |
| 5,534,913 A | 7/1996 | Majeti et al. | 348/7 |
| 5,546,395 A | 8/1996 | Sharma et al. | 370/84 |
| 5,563,908 A | 10/1996 | Kaku et al. | 375/222 |
| 5,566,211 A | 10/1996 | Choi | 375/332 |
| 5,598,401 A | 1/1997 | Blackwell et al. | 379/94 |
| 5,625,643 A | 4/1997 | Kaku et al. | 375/222 |
| 5,634,022 A | 5/1997 | Crouse et al. | 395/704 |
| 5,640,387 A | 6/1997 | Takahashi et al. | 370/359 |
| 5,646,958 A | 7/1997 | Tsujimoto | 375/233 |
| 5,671,250 A | 9/1997 | Bremer et al. | 375/222 |
| 5,694,420 A | 12/1997 | Ohki et al. | 375/222 |
| 5,710,792 A | 1/1998 | Fukawa et al. | 375/229 |
| 5,724,393 A | 3/1998 | Dagdeviren | 375/296 |
| 5,726,765 A | 3/1998 | Yoshida et al. | 358/412 |
| 5,729,226 A | 3/1998 | Betts et al. | 341/94 |
| 5,732,104 A | 3/1998 | Brown et al. | 375/222 |
| 5,734,663 A | 3/1998 | Eggenberger | 371/39.1 |
| 5,751,717 A | 5/1998 | Babu et al. | 370/466 |
| 5,751,796 A | 5/1998 | Scott et al. | 379/93.31 |
| 5,754,594 A | 5/1998 | Betts et al. | 375/285 |
| 5,757,849 A | 5/1998 | Gelblum et al. | 375/222 |
| 5,757,865 A | 5/1998 | Kaku et al. | 375/344 |
| 5,761,247 A | 6/1998 | Betts et al. | 375/316 |
| 5,768,311 A | 6/1998 | Betts et al. | 375/222 |
| 5,778,024 A | 7/1998 | McDonough | 375/216 |
| 5,784,377 A | 7/1998 | Baydar et al. | 370/463 |
| 5,784,405 A | 7/1998 | Betts et al. | 375/222 |
| 5,784,415 A | 7/1998 | Chevillat et al. | 375/341 |
| 5,793,809 A | 8/1998 | Holmquist | 375/242 |
| 5,796,808 A | 8/1998 | Scott et al. | 379/93.31 |
| 5,801,695 A | 9/1998 | Townshend | 375/340 |
| 5,805,669 A | 9/1998 | Bingel et al. | 379/28 |
| 5,809,075 A | 9/1998 | Townshend | 375/254 |
| 5,812,537 A | 9/1998 | Betts et al. | 370/286 |
| 5,815,534 A | 9/1998 | Glass | 375/326 |
| 5,822,371 A | 10/1998 | Goldstein et al. | 375/242 |
| 5,825,816 A | 10/1998 | Cole et al. | 375/222 |
| 5,825,823 A | 10/1998 | Goldstein et al. | 375/286 |
| 5,831,561 A | 11/1998 | Cai et al. | 341/106 |
| 5,835,532 A | 11/1998 | Strolle et al. | 375/233 |
| 5,835,538 A | 11/1998 | Townshend | 375/295 |
| 5,838,724 A | 11/1998 | Cole et al. | 375/222 |
| 5,839,053 A | 11/1998 | Bosch et al. | 455/13.1 |
| 5,844,940 A | 12/1998 | Goodson et al. | 375/222 |
| 5,850,388 A | 12/1998 | Anderson et al. | 370/252 |
| 5,850,421 A | 12/1998 | Misra et al. | 375/354 |
| 5,852,630 A * | 12/1998 | Langberg et al. | 375/219 |
| 5,852,631 A | 12/1998 | Scott | 375/222 |
| 5,862,141 A | 1/1999 | Trotter | 370/468 |
| 5,862,179 A | 1/1999 | Goldstein et al. | 375/242 |
| 5,862,184 A | 1/1999 | Goldstein et al. | 375/295 |
| 5,870,429 A | 2/1999 | Moran, III et al. | 375/222 |
| 5,872,817 A | 2/1999 | Wei | 375/341 |
| 5,881,066 A | 3/1999 | Lepitre | 371/20.5 |
| 5,881,102 A | 3/1999 | Samson | 375/222 |
| 5,887,027 A | 3/1999 | Cohen et al. | 375/222 |
| 5,911,115 A | 6/1999 | Nair et al. | 455/63 |
| 5,914,982 A | 6/1999 | Bjarnason et al. | 375/222 |
| 5,918,204 A | 6/1999 | Tsurumaru | 704/214 |
| 5,926,506 A | 7/1999 | Berthold et al. | 375/222 |
| 6,178,200 B1 * | 1/2001 | Okunev et al. | 375/222 |

OTHER PUBLICATIONS

Gardner, *Interpolation in Digital Modems—Part I: Fundamentals*, IEEE Transactions on Communications, vol. 41, No. 3, pp. 501–507 (Mar. 1993).

Humblet et al., *The Information Driveway*, IEEE Communications Magazine, pp. 64–68 (Dec. 1996).

Kalet et al., *The Capacity of PCM Voiceband Channels*, IEEE International Conference on Communications '93, pp. 507–511 (Geneva, Switzerland, May 23–26, 1993).

Mueller et al., *Timing Recovery in Digital Synchronous Data Receiver*, IEEE Transactions on Communications, vol. Com–24, No. 5, pp. 516–531 (May 1976).

Okubo et al., *Building Block Design of Large Capacity PCM–TDMA Subscriber System and Direct Digital Interface to Digital Exchange*, Japan Radio Co., Ltd., pp. 69–73 (Japan).

Pahlavan et al., *Nonlinear Quantization and the Design of Coded and Uncoded Signal Constellations,* IEEE Transactions on Communications, vol. 39, No. 8, pp. 1207–1215 (Aug. 1991).

Proakis, *Digital Signaling Over a Channel with Intersymbol Interference, Digital Communications,* pp. 373, 381 (McGraw–Hill Book Company, 1983).

Williams et al., *Counteracting the Quantisation Noise from PCM Codecs,* BT Laboratories, pp. 24–29 (UK).

*A Digital Modem and Analogue Modem Pair for Use on the Public Switched Telephone Network (PSTN) at Data Signalling Rates of Up to 56 000 Bit/s Downstream and 33 600 Bit/s Upstream,* ITU–T V.90 (Sep. 1998).

*Series V: Data Communication Over the Telephone Network; Interfaces and voiceband modems; A modem operating at data signalling rates of up to 33 600 bit/s for use on the general switched telephone network and on leased point–to–point 2–wire telephone type circuits,* ITU–T V.34 (Oct. 1996).

Bell, R.A., et al., *Automatic Speed Reduction and Switched Network Back–up,* IBM Technical Disclosure Bulletin, vol. 32, No. 1, pp. 154–157 (Jun. 1989).

Abbiate, J.C., et al., *Variable–Data Transmission Modem,* IBM Tecnical Disclosure Bulletin, vol. 17, No. 11, pp. 3301–3302 (Apr. 1975).

*Data Communication Over the Telephone Network; Procedures for Starting Sessions of Data Transmission Over the General Switched Telephone Network,* ITU–T V.8 (Sep. 1994).

*Line Quality Monitoring Method,* IBM Technical Disclosure Bulletin, vol. 18, No. 8, pp. 2726–2726 (Jan. 1976).

*Loopback Tests for V.54 Data Communication Equipment,* IBM Technical Disclosure Bulletin, vol. 32, No. 3A, pp. 295–299 (Aug. 1989).

*On–Line Real Time Modem Testing,* IBM Technical Disclosure Bulletin, vol. 20, No. 6, pp. 2252–2254 (Nov. 1977).

Pierobon, Gianfranco L., *Codes of Zero Spectral Density at Zero Frequency,* IEEE Transactions on Information Theory, vol. IT–30, No. 2, pp. 435–439 (Mar. 1984).

Marcus, Brian H, et al., *On Codes with Spectral Nulls at Rational Submultiples of the Symbol Frequence,* IEEE Transactions on Information Theory, vol. IT–33, No. 4, pp. 557–568 (Jul. 1987).

Fischer, Robert, et al., *Signal Mapping for PCM Modems,* ITU–Telecommunications Standardization Sector PCM '97–120, V.pcm Rapporteur Meeting, (Sunriver, Oregon; Sep. 4–12, 1997).

*Pulse Code Modulation (PCM) of Voice Frequencies,* ITU–T, Recommendation G.711 (Geneva, 1972).

*Series G: Digital Transmission Systems: Terminal Equipments—Coding of analogue signals by pulse code modulation; Pulse code modulation (PCM) of voice frequencies,* ITU–T, Recommendation G.711 (Geneva, 1996).

*Data Communication Over the Telephone Network; Error–Correcting Procedures for DCEs Using Asynchronous–to–Synchronous Conversion,* ITU–T V.42 (Mar. 1993).

*Improvement to Spectral Shaping Techniques,* Research Disclosure, V. 41, n415,415111, pp. 1550–1551 (Nov. 1998).

*TIA Standard Draft: North American Telephone Network Transmission Model for Evaluating Analog Client to Digitally Connected Server Modems,* Telecommunications Industry Association, PN3857, Draft 10 (Feb. 1999).

Davis, Gordon T., *DSP and MATLAB implementation of model–based constellation generation* (Sep. 18, 1998).

Woodruff, K.R, et al, *Automatic and Adaptive System and Efficient Communication in Noisy Communication Line Environments,* IBM Technical Disclosure Bulletin, vol. 24, No. 9, pp. 4627–4629 (Feb. 1982).

Godard, D., et al., *Decision Feedback Equalizer Stabilization in Adaptive Mode,* IBM Technical Disclosrue Bulletin, vol. 24, No. 11A, pp. 5691–5692 (Apr. 1982).

Borgnis–Desbordes, P., et al. *Variable–Speed Data Transmission,* IBM Technical Disclosure Bulletin, vol. 27, No. 4A, pp. 2269–2270 (Sep. 1984).

Couland, G., et al., *Analog Wrap Self–Tests in Modems During Retrain Operations,* IBM Technical Disclosure Bulletin, vol. 28, No. 6, p. 2457 (Nov. 1985).

Maddens, F., *Sixteen–State Forward Convolutional Encoder,* IBM Technical Disclosure Bulletin, vol. 28, No. 6, pp. 2466–2468 (Nov. 1985).

*Remote Modem–Type Self–Learning,* IBM Technical Disclosure Bulletin, vol. 28, No. 6, pp. 2398–2399 (Nov. 1985).

Maddens, F., *Sixteen–State Feedback Convolutional Encoder,* IBM Technical Disclosure Bulletin, vol. 28, No. 10, pp. 4212–4213 (Mar. 1986).

Bell, R. A., et al., *Automatic Speed Reduction and Switched Network Back–up,* IBM Technical Disclosure Bulletin, vol. 32, No. 1, pp. 154–157 (Jun. 1989).

Nobakht, R.A., *Trellis–Coded Modulation Coding Scheme for a 19/2 Kbps Modem,* IBM technical Disclosure Bulletin, vol. 36, No. 11, pp. 167–170 (Nov. 1993).

Nobakht, R.A. *Unified Table Based Subset Decoder for the Viterbi Algorithm,* IBM Technical Disclosure Bulletin, vol. 37, No. 09, pp. 581–587 (Sep. 1994).

Nobakht, R.A., *Trellis Subset Decoder Algorithm Based on a Pattern Recognition Scheme,* IBM Technical Disclosure Bulletin, vol. 37, No. 10, pp. 693–697 (Oct. 1994).

Abbiate, J.C., et al, *Variable–Data Transmission Modem,* IBM Technical Disclosure Bulletin, vol. 17, No. 11, pp. 3301–3302 (Apr. 1975).

Barlet, J., et al., *Full Speed Recovery in High Speed Modems,* IBM Technical Disclosure Bulletin, vol. 17, 23, No. 2, pp. 641–643 (Jul. 1980).

Dialog Abstract, *Sample rate converter for duplex modem,* European Patent No. 285413.

Dialog Abstract, *Two–speed full–duplex modem for telephone network,* PCT WO 8501407.

Dialog Abstract, *Digital data transmission system,* European Patent No. 124674.

Dialog Abstract, *Facsimile communication controller,* Japanese Publication No. 04–175060 (Jun. 23, 1992).

Dialog Abstract, *Picture communication equipment,* Japanese Publication No. 03–120954 (May 23, 1991).

Dialog Abstract, *Radio date transmission,* Japanese Publication No. 01–179535 (Jul. 17, 1989).

Dialog Abstract, *Facsimile device,* Japanese Publication No. 57–164654 (Oct. 9, 1982).

Dialog Abstract, *Data repeater,* Japanese Publication No. 57–087255 (Mar 31, 1982).

Dialog Abstract, *Blinding training method for decision feedback equaliser having feed–forward and feedback filters,* European Patent No. 880253.

Dialog Abstract, *Processing method for distorted signal received by qam receiver,* European Patent No. 465851.

Dialog Abstract, *Establishing wireless communication channel,* PCT No. WO 9905820.

Dialog Abstract, *High–speed rate adaptive subscriber line digital data modem*, PCT No. WO 9830001.

Dialog Abstract, *Digital modem in digital modulation system*, Japanese Patent No. 8116341.

Dialog Abstract, *Communication equipment and radio communication adapter*, Japanese Publication No. 08–340289 (Dec. 24, 1996).

Dialog Abstract, *Data recording method*, Japanese Publication No. 05–089597 (Apr. 9, 1993).

Dialog Abstract, *Transmission control system for data communication and its modem equipment*, Japanese Publication No. 02–228853 (Sep. 11, 1990).

Nabuib, A.F., et al., Dialog Abstract, *A space–time coding modem for high–data–rate wireless communication*, IEEE Journal of Selected Areas in Communications, vol. 16, No. 8, pp. 1459–1478 (Oct. 1998).

Denno, S., et al., Dialog Abstract, *Mbit/s burst modem with an adaptive equalizer for TDMA mobile radio communication*, IEICE Transactions on Communications, vol. E81–B, No. 7, pp. 1453–1461 (Jul. 1998).

Naguib, A.F., et al., Dialog Abstract, *A space–time coding modem for high–data–rate wireless communications*, GLOBECOM 97, IEEE Global Telecommunications Conference, vol. 1, pp. 102–109 (1997).

Kobayashi, K., et al., Dialog Abstract, *Fully digital burst modem for satellite multimedia communications sytems*, IEICE Transactions on Communications, vol. E80–B, No. 1, pp. 8–15 (Jan. 1997).

Skellern, D.J., et al., Dialog Abstract, *A high speed wireless LAN*, IEEE Micro, vol. 17, No. 1, pp. 40–47 (Jan.–Feb. 1997).

Enomoto, K., et al., Dialog Abstract, *A mode switching type burst demodulator AFC*, Transactions of the Institute of Electronics, Information and Communication Engineers, vol. J76B–II, No. 5, pp. 415–421 (May 1993).

Betts, W., Dialog Abstract, *Nonlinear encoding by surface projection*, International Conference on Data Transmission—Advances in Modem and ISDN Technology and Applications (Sep. 23–25, 1992).

Schilling, D.L., et al., Dialog Abstract, *The FAVR meteor burst communication experiment*, Military Communications in a Changing World MILCOM '91 (Nov. 4–7, 1991).

Jacobsmeyer, J.M., Dialog Abstract, *Adaptive trellis–coded modulation for bandlimited meteor burst channels*, IEEE Journal of Selected Areas in Communications, vol. 10, No. 3, pp. 550–561 (Apr. 1992).

Sato, T., et al., Dialog Abstract, *Protocol configuration and verification of an adaptive error control scheme over analog cellular networks*, IEEE Transactions on Vehicular Technology, vol. 41, No. 1, pp. 69–76 (Feb. 1992).

Lee, L.–N., et al., Dialog Abstract, *Digital signal processor–based programmable BPSK/QPSK/offset–QPSK modems*, COMSAT Technical Review, pp. 195–234 (Fall 1989).

Sato, T., et al., Dialog Abstract, *Error–free high–speed data modem*, Oki Technical Review, vol. 56, No. 133, pp. 20–26 (Apr. 1989).

Seo, J.–S, et al., Dialog Abstract, *Performance of convolutional coded SQAM in hardlimited satellite channels*, IEEE International Conference on Communications BOSTON-ICC/89, vol. 2, pp. 787–791 (Jun. 11–14, 1989).

Murakama, K., et al., Dialog Abstract, *FEC combined burst–modem for business satellite communications use*, IEEE/IECE Global Telecommunications Conference 1987, vol. 1, pp. 274–280 (Japan, Nov. 15–18, 1987).

McVerry, F., Dialog Abstract, *Performance of a fast carrier recovery scheme for burst–format DQPSK transmission over satellite channels*, International Conference on Digital Processing of Signals in Communications, pp. 165–172 (United Kingdom, 1985).

Filter, J.H.J., Dialog Abstract, *An algorithm for detecting loss of synchronisation in data transmission test sets (modems)*, Transactions of the South African Institute of Electrical Engineers, vol. 76, No. 1, pp. 39–43 (Jan. 1985).

Gersho, A., Dialog Abstract, *Reduced complexity implementation of passband adaptive equlizers*, IEEE Journal on Selected Areas in Communications, vol. SAC–2, No. 5, pp. 778–779 (Sep. 1984).

Dialog Abstract, *High–speed full–duplex modem reduces telephone connect time*, EDN, vol. 27, No. 18, p. 77 (Sep. 15, 1982).

Chadwick, H., Dialog Abstract, *Performance of a TDMA burst modem through a dual nonlinear satellite channel*, Fifth International Conference on Digital Satellite Communications, pp. 63–67 (Italy, Mar. 23–26, 1981).

Nussbaumer, H., Dialog Abstract, *Reducing the acquisition time in an automatic equalizer*, IBM Technical Disclosure Bulletin, vol. 18, No. 5, pp. 1465–1479 (Oct. 1975).

Uzunoglu, V., et al., Dialog Abstract, *Synchronous and the coherent phase–locked synchronous oscillators: new techniques in synchronization and tracking*, IEEE Transactions on Circuits and Systems, vol. 36, No. 7, pp. 997–1004 (Jul. 1989).

Minei, I., et al., Dialog Abstract, *High–speed Internet access through unidirectional geostationary satellite channels*, IEEE Journal on Selected Areas in Communications, vol. 17, No. 2, pp. 345–359 (Feb., 1999).

Ovadai, S., Dialog Abstract, *The effect of interleaver depth and QAM channel frequencey offset on the performance of multichannel AM–VSB/256–QAM video lightwave transmission systems*, International Conference on Telecommunications: Bridging East and West Through Communications, vol. 1, pp. 339–343 (Greece, Jun. 21–25, 1998).

Johnson, R.W., et al., Dialog Abstract, *Error correction coding for serial–tone HG transmission*, Seventh International Conference on HF Radio Systems, and Techniques, pp. 80–84 (United Kingdom, Jul. 7–10, 1997).

Karasawa, Y., et al., Dialog Abstract, *Cycle slip in clock recovery on frequency–selective fading channels*, IEEE Transactions on Communications, vol. 45, No. 3, pp. 376–383 (Mach. 1997).

Umehira, M., et al., Dialog Abstract, *design and performance of burst carrier recovery using a phase compensated filter*, Transactions of the Institute of Electronics, Information and Communication Engineers, vol. J78B–II, No. 12, pp. 735–746 (Dec. 1995).

De Bot, P., et al., Dialog Abstract, *An example of a multi-resolution digital terrestrial TV modem*, Proceeings of ICC '93—IEEE International Conference on Communications, vol. 3, pp. 1785–1790 (Switzerland, May 23–26, 1993).

Lei, Chen, et al., Dialog Abstract, *Single–tone HF High speed data modem*, Proceedings of Tencon '93—IEEE Region 10 International Conference on Computers, Communications and Automation, vol. 3, pp. 94–98 (China, Oct. 19–21, 1993).

Woerner, B.D., et al., Dialog Abstract, *Simulation issues for future wireless modems, IEEE Communications,* vol. 32, No. 7, pp. 42–53 (Jul. 1994).

Sato, T., et al., Dialog Abstract, *Vehicle terminal equipment with dedicated DSP, Oki Technical Review,* vol. 58, No. 144, pp. 49–52 (Jul. 1992).

Sato, T., et al., Dialog Abstract, *Protocol configuration and verification of an adaptive error control scheme over analog cellular networks, IEEE Transactions on Vehicular Technology,* vol. 41, No. 1, pp. 69–76 (Feb. 1992).

Tamm, Yu.A., Dialog Abstract, *The effect of suppressing harmonic interference using an adaptive equalizer, Elektrosvyaz,* vol. 45, No. 3, pp. 5–10 (Mach. 1990).

Saleh, A.A.M., et al., Dialog Abstract, *An experimental TDMA indoor radio communications systemusing slow frequency hopping and coding, IEEE Transactions on Communications,* vol. 39, No. 1, pp. 152–162 (Jan. 1991).

Nergis, A., Dialog Abstract, *Optimum HF digital communications sytems with block coding and interleaving techniques, Proceedings of the 1990 Bilkent International Conference on New Trends in Communication, Control and Signal Processing,* vol. 1, pp. 511–517 (Turkey, Jul. 2–5, 1990).

Kawamata, F., et al., Dialog Abstract,*An evaluation of voice codecs and facsimiles, Review of the Communications Research Laboratory,* vol. 36, pp. 69–73 (Mar. 1990).

Sato, T., et al., Dialog Abstract,*Error–free high–speed data transmission protocol simultaneously applicable to both wire and mobile radio channels, 38$^{th}$ IEEE Vehicular Technology Conference: 'Telecommunications Freedom—Technology on the Move',* pp. 489–496 (Jun. 15–17, 1988).

Dialog Abstract, *1200–bit/s cellular modem DLD03H, Oki Technical Review,* vol. 53, No. 127, pp. 70–72 (Jul. 1987).

Chamberlin, J.W., et al., Dialog Abstract, *Design and field test of a 256–QAM DIV modem, IEEE Journal on Selected Areas in Communications,* vol. SAC–5, No. 3, pp. 349–356 (Apr. 1987).

De Cristofaro, R., et al., Dialog Abstract,*A 120 Bv/s QPSK modem designed for the INTELSAT TDMA network, International Journal of Satellite Communications,* vol. 3, Nos. 1–2, pp. 145–160 (Jan.Jun., 1985).

Shumate, A., Dialog Abstract, *Error correction coding for channels subject to occasional losses of bit count integrity, IEEE Military Communications Conference,* vol. 1, pp. 89–93 (Oct. 21–24, 1984).

Suyderhoud, H., et al., Dialog Abstract, *Investigation of 9.6 kb/s data transmission via a PCM link at 64 kb/s with and without link errors, International Journal of Satellite Communications,* vol. 2, No. 1, pp. 81–87 (Jan.–Mar. 1984).

Smith, C., Dialog Abstract, *Relating the performance of speech processors to the bit error rate, Speech Technology,* vol. 2, No. 1, pp. 41–53 (Sep.–Oct. 1983).

Suyderhoud, H., et al., Dialog Abstract, *Investigation of 9.6–kbit/s data transmission via a PCM link at 64 kbit/s with and without link errors, Sixth International Conference on Digital Satellite Communications Proceedings,* pp. 26–33 (Sep. 19, 23, 1983).

Kittel, L., Dialog Abstract, *Analogue and discrete channel models for signal transmission in mobile radio, Frequenz.,* vol. 36, Nos. 4–5, pp. 153–160 (Apr.–May 1982).

Farrell, P.G., et al., Dialog Abstract, *Soft–decision error control of h.f. data transmission, IEE Proceedings F (Communications, Radar and Signal Processing),* vol. 127, No. 5, pp. 389–400 (Oct. 1980).

Johnson, A.L., Dialog Abstract, *Simulation and implementation of a modulation system for overcoming ionospheric scintillation fading, AGARD Conference Proceedings No. 173 on Radio Systems, and the Ionosphere,* pp. 3/1–5 (Greece, May 26–30, 1975).

Matsumura, K., et al., Dialog Abstract, *Anti–interference data–transmission set of HF radio equipment, Mitsublishi Electric Engineer,* No. 41, pp. 18–23 (Sep., 1974).

Blank, H.A., et al., Dialog Abstract,*A Markov error channel model, 1973 National Telecommunications Conference,* vol. 1, pp. 15B/1–8 (Nov. 26–28, 1973).

McGruther, W.G., Dialog Abstract, *Long term error performance data for operation at 2400 bps ona nonswitched private line network, Summaries of papers presented at 1970 Canadian symposium on communications,* pp. 65–66 (Canada, Nov. 12–13, 1970).

Burton, H.O., et al., Dialog Abstract, *On the use of error statistics from data transmission on telephone facilities to estimate performance of forward–error–correction, 1970 international conference on communications,* p. 21 (Jun. 8–10, 1970).

Bowen, R.R., Dialog Abstract, *Application on burst error correction codes to data modems for dispersive channels, Proceedings of the 1970 international symposium on information theory,* p. 1 (Netherlands, Jun. 15–19, 1970).

Pierce, A.W., et al., Dialog Abstract, *Effective application of forward–acting error–control coding to multichannel h.f. data modems, IEEE Transactions on Communication Technology,* vol. Com–18, No. 4, pp. 281–294 (Aug. 1970).

West, R.L., Abstract, *Data Concentration Method, IBM Technical Dislcosure Bulletin,* pp. 487–489; http://w3.infogate.ibm.com:1207/SESS506884/GETDOC/39/2/1 (Jul., 1975).

Haas, L.C., et al., Abstract, *Received Line Signal Quality Analysis, IBM Technical Disclosure Bulletin,* pp. 5414–5416; http://w3.infogate.ibm.com:1207/SESS506884/GETDOC/43/1/1 (May, 1981).

Nussbaumer, H., Abstract,*Reducing the Acquisition Time in an Automatic Equalizer, IBM Technical Disclosure Bulletin,* pp. 1465–1479; http://w3.infogate.ibm.com:1207/SESS506884/GETDOC/40/2/1 (Oct. 1975).

Dialog Abstract, *Listener echo canceller for digital communication system,* PCT No. WO 9310607.

Dialog Abstract *Reduced time remote access method for modem computer,* PCT No. WO 9209165.

* cited by examiner

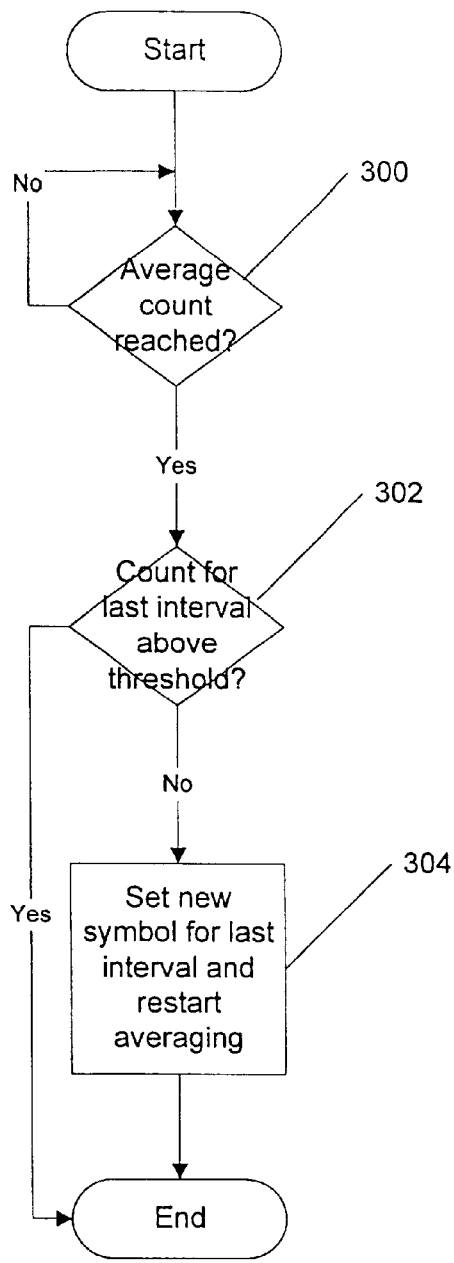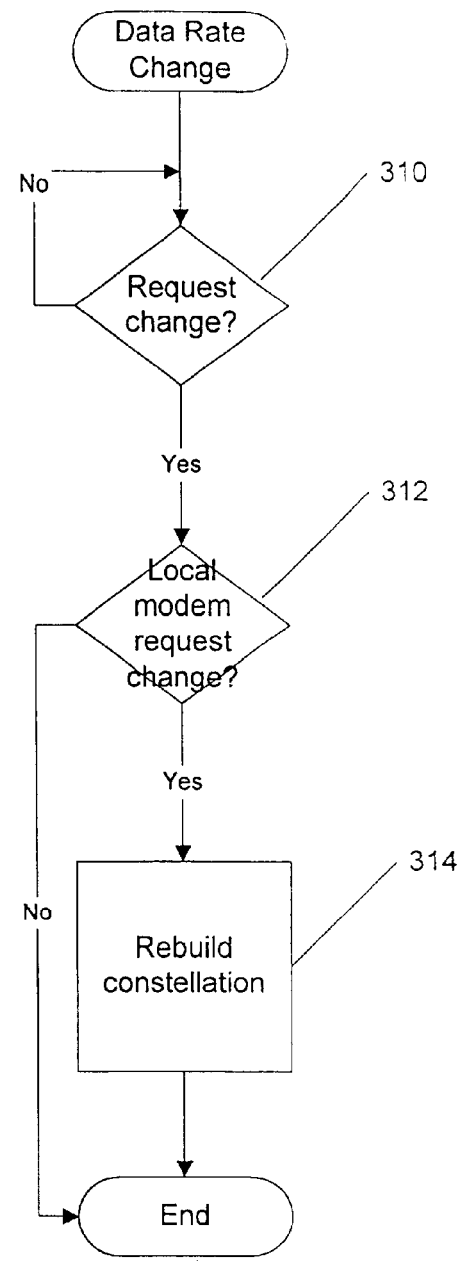
FIG. 5
FIG. 6

SYSTEMS, METHODS AND COMPUTER PROGRAM PRODUCTS FOR DATA MODE REFINEMENT OF MODEM CONSTELLATION POINTS

FIELD OF THE INVENTION

The present invention relates generally to the field of digital communications, and, more particularly, to the selection of code points for digital transmission of information.

BACKGROUND OF THE INVENTION

The demand for remote access to information sources and data retrieval, as evidenced by the success of services such as the World Wide Web, is a driving force for high-speed network access technologies. The public switched telephone network (PSTN) offers standard voice services over a 4 kHz bandwidth. Traditional analog modem standards generally assume that both ends of a modem communication session have an analog connection to the PSTN. Because data signals are typically converted from analog to digital when transmitted towards the PSTN and then from digital to analog when received from the PSTN, data rates may be limited to 33.6 kbps as defined in the V.34 Transmission Recommendation developed by the International Telecommunications Union (ITU).

The need for an analog modem may be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN offers comfortable data rates for Internet access, telecommuting, remote education services, and some forms of video conferencing. ISDN deployment, however, has generally been very slow due to the substantial investment required of network providers for new equipment. Because the ISDN is not very pervasive in the PSTN, the network providers have typically tariffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). Local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology can accelerate data downstream from the Internet or other information source to a subscriber's computer at data rates of up to 56 kbps, even when the subscriber is connected to the PSTN via an analog local loop.

To understand how the V.90 Recommendation achieves this higher data rate, it may be helpful to briefly review the operation of V.34 analog modems. V.34 modems are generally optimized for a configuration in which both ends of a communication session are connected to the PSTN by analog lines. Even though most of the PSTN is digital, V.34 modems treat the network as if it were entirely analog. Moreover, the V.34 Recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the g-law or A-law companding standard (i.e., the ITU G.711 Recommendation)

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions in the downstream path, outside of the conversion made at the subscriber's modem to enable transmission at 56 kbps.

The general environment for which the V.90 standard has been developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN by the PCM transmitter 36 where they are received by a network codec. The PCM data is then transmitted through the PSTN 28 until reaching the central office 32 to which the client modem 34 is connected. Before transmitting the PCM data to the client modem 34, the data is converted from its current form as either $\mu$-law or A-law companded PCM codewords to pulse amplitude modulated (PAM) voltages by the codec expander (digital-to-analog (D/A) converter) 38. These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must be only a single digital-to-analog conversion and subsequent analog-to-digital conversion between the server modem 26 and the client modem 34. Recall that analog-to-digital conversions in the PSTN 28 may introduce quantization noise, which may limit the data rate as discussed hereinbefore. The A/D converter 46 at the client modem 34, however, may have a higher resolution than the A/D converters used in the analog portion of the PSTN 28 (e.g., 16 bits versus 8 bits), which results in less quantization noise. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either $\mu$-law or A-law companded PCM codewords by the codec compressor (AID converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard offers increased data rates (e.g., data rates up to 56 kbps) in the downstream direction from a server to a subscriber or client. Upstream communication still takes place at conventional data rates as provided for in the V.34 standard. Nevertheless, this asymmetry may be particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists mainly of keystroke and mouse commands, which are readily handled by the conventional rates provided by V.34.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors prevent actual transmission rates from reaching this ideal rate. First, even though the problem of quantization error has been substantially eliminated by using PCM encoding and PAM for transmission, additional noise in the network or at the subscriber premises, such as non-linear distortion and crosstalk, may limit the maximum data rate. Furthermore, the $\mu$-law or A-law companding techniques do not use uniform PAM voltage levels for defining the PCM codewords. The PCM codewords representing very low levels of sound have PAM voltage levels spaced close together. Noisy transmission facilities may prevent these PAM voltage levels from being distinguished from one another thereby causing loss of data. Accordingly, to provide greater separation between the PAM voltages used for transmission, not all of the 256 PCM codewords are used.

It is generally known that, assuming a convolutional coding scheme, such as trellis coding, is not used, the number of symbols required to transmit a certain data rate is given by Equation 1:

$$bps = R_s \log_2 N_s \qquad \text{EQ. 1}$$

where bps is the data rate in bits per second, $R_s$ is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_s = 2^{56000/8000} = 128 \qquad \text{EQ. 2}$$

Thus, the 128 most robust codewords of the 256 available PCM codewords are chosen for transmission as part of the V.90 standard.

The V.90 standard, therefore, provides a framework for transmitting data at rates up to 56 kbps provided the network is capable of supporting the higher rates. The most notable requirement is that there can be at most one digital-to-analog conversion and subsequent analog-to-digital conversion in the path. Nevertheless, other digital impairments, such as robbed bit signaling (RBS) and digital mapping through PADs, which results in attenuated signals, may also inhibit transmission at V.90 rates. Communication channels exhibiting non-linear frequency response characteristics are yet another impediment to transmission at the V.90 rates. Moreover, these other factors may limit conventional V.90 performance to less than the 56 kbps theoretical data rate.

Because digital impairments, such as RBS and PAD, may vary from connection to connection, V.90 provides for learning the levels of the code points for the PCM codewords when a connection is established. For example, in Phase 3 of the V.90 standard, a sequence of PCM levels are sent from the server modem to the client modem. The resulting levels that are received by the client modem are used to help determine the nature of the digital portion of the telephone connection and to select appropriate code points for signal constellations used to transfer data.

During transmission and acquisition of these levels by the client modem, some levels may be corrupted by noise, non-linearities, and other impairments within the network. Large disturbances in the levels acquired by the client modem can significantly detract from the client modem capability to select appropriate code points for its signal constellations, which may lead to sub-optimum connections and possibly failure to connect in some cases.

The digital PSTN transports information using a six symbol framing structure. That is, a frame includes six data frame intervals with each data frame interval holding a single symbol. If noise is present during the training interval which is used to establish constellations for use in decoding symbols transmitted during a frame, then the learned levels may depart from the ideal levels. Thus, during data mode operation after the startup sequence has completed, inaccuracies in the constellations generated during startup may result in errors in symbol detection. These errors may reduce the overall data rate for the modem. Thus, a need exists for improvements in reducing the impact of noise, non-linearities and other impairments during data mode operations of a PCM modem where the constellation of the PCM modem is built from learned levels.

SUMMARY OF THE INVENTION

In light of the above discussion, it is an object of the present invention to improve performance of a PCM modem during data mode operations.

These and other objects, advantages, and features of the present invention may be provided by methods, systems and computer program products for refining constellation values in a Pulse Code Modulated (PCM) code point sequence of a PCM modem by averaging received levels associated with received symbols for a code point of interest received during data mode operation of the PCM modem so as to provide an average received level for the code point of interest and revising a constellation value corresponding to the code point of interest in the PCM code sequence based on the average received level for the code point of interest so as to provide a refined constellation value. Preferably, the averaging is performed by detecting that a symbol corresponding to the code point of interest has been received by the PCM modem and incorporating the received level of the symbol into a running sum of previously received levels for the symbol. If a predefined number of received levels have been incorporated into the running sum then the running sum is divided by the predefined number of received levels. It is also preferred that, after determining the sum for the code point of interest, the running sum is set to zero and a new code point selected as the code point of interest.

In a further aspect of the present invention, if the received level of the symbol deviates from the constellation value associated with the code-point of interest by less than a predefined threshold, then the received level of the symbol is incorporated into the running sum of previously received levels for the symbol. If the received level of the symbol does not deviate by less than the predefined threshold, then the received level is not incorporated into the running sum. Thus, large errors in received levels may be excluded from the average so as to not corrupt the average. Preferably, the predefined threshold is about ¼ the value of the distance between the code point of interest and an adjacent code point in the PCM code point sequence.

In a preferred embodiment of the present invention, the PCM code point sequence is a plurality of PCM code point sequences associated with a plurality of framing intervals. In such an embodiment, the averaging and incorporation of averages into a constellation are carried out for a code point of interest in each of the plurality of framing intervals.

In a further aspect of the present invention, dead spots in symbol usage, which may result from modulous encoding in the frame intervals, may be accounted for by determining if a count of received levels associated with a running average of a first interval is not greater than a minimum threshold when a count from a second interval has reached the predefined number of received levels. A new code point is then selected as the code point of interest for the first interval if the count of received levels associated with the running average of the first interval is not greater than the minimum threshold. Thus, if one interval does not receive symbols corresponding to the code point of interest with a sufficient frequency, then the code point of interest may be changed for that interval to a new code point of interest. Typically, dead spots occur in the last frame interval, thus, in one embodiment of the present invention, the first interval is the last frame interval. In a preferred embodiment, the minimum threshold is zero.

In a particular embodiment of the present invention, the constellation value for the code point of interest is revised by averaging the constellation value corresponding to the code point of interest with the average received level and replacing the constellation value with the average of the constellation value and the average received level.

In a further aspect of the present invention, the refined constellation values may be saved in the event that the constellation is rebuilt by identifying learned levels associated with the constellation values and replacing the learned levels associated with the constellation values with refined constellation values prior to rebuilding of the constellation values. Thus, if the learned levels are stored as values in an array, the learned levels may be identified by storing the learned levels in the array so as to indicate that the value stored in the array is incorporated in the constellation values in the PCM code point sequence of the PCM modem. These values may then be replaced by the refined constellation values prior to rebuilding the constellation from the learned levels. In particular, the learned levels utilized in the previous constellation may be identified in the learned level array by storing the learned levels in the array so as to have a sign opposite to that of learned levels in the array which are not incorporated in the constellation values. Preferably, the sign of the learned levels incorporated in the constellation values is negative.

In still another aspect of the present invention where the constellation values are constellation values for a client modem, in the case where the server modem requests a rate change, rebuilding constellation values so as to provide new constellation values corresponding to the changed data rate may be ignored unless the client modem requests a data rate change.

As will be appreciated by those of skill in the art, the present invention may be embodied as methods, systems and/or computer program products.

BRIEF DESCRIPTION OF THE DRAWINGS

Other features of the present invention will be more readily understood from the following detailed description of specific embodiments thereof when read in conjunction with the accompanying drawings, in which:

FIG. 5 is a flowchart illustrating additional aspects of an embodiment of the present invention;

FIG. 6 is a flowchart illustrating additional aspects of an embodiment of the present invention.

DETAILED DESCRIPTION OF THE PREFERRED EMBODIMENTS

Figure 1:
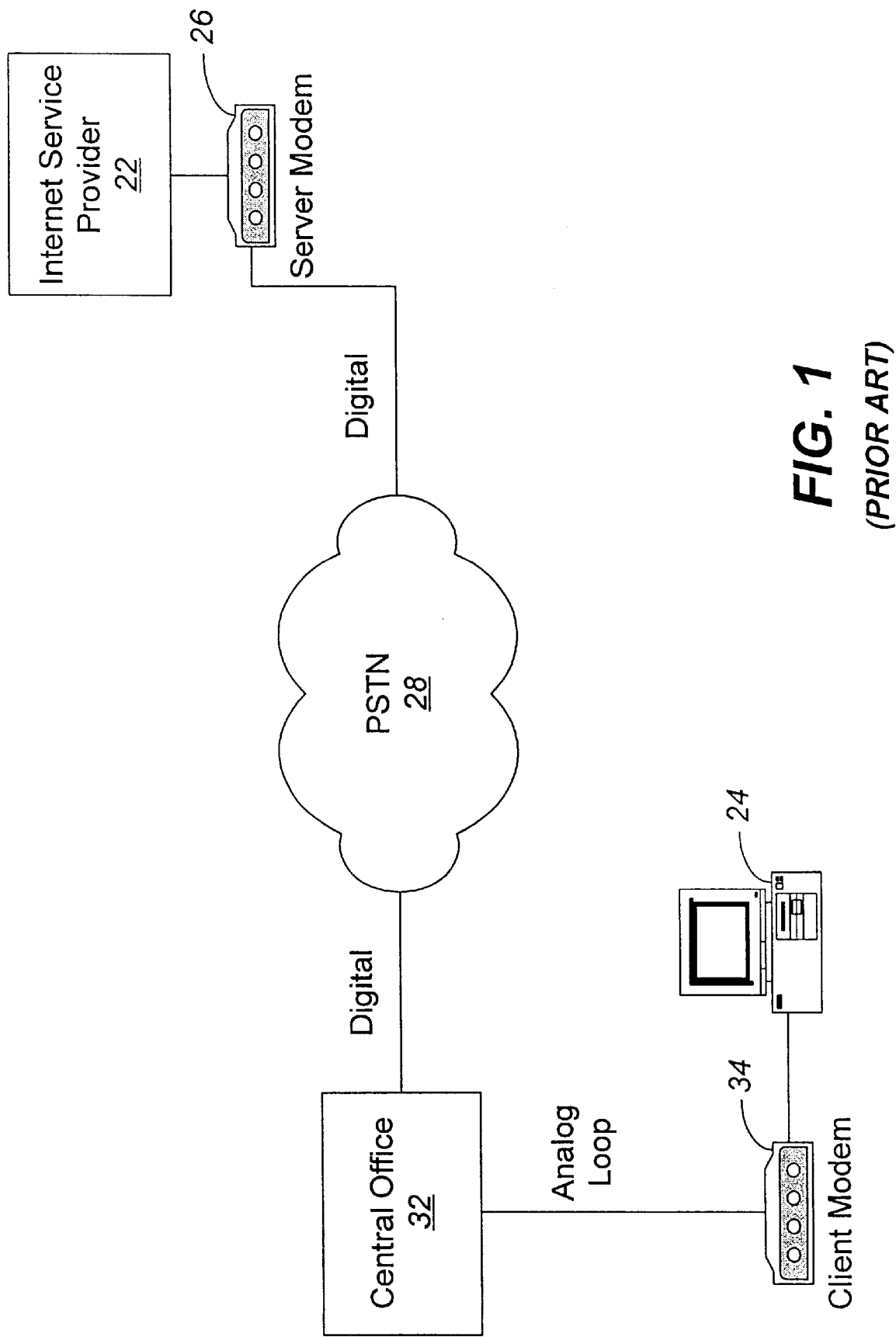
FIG. 1 is a block diagram that illustrates a typical V.90 connection between a subscriber and an ISP in accordance with the prior art.
Figure 2:
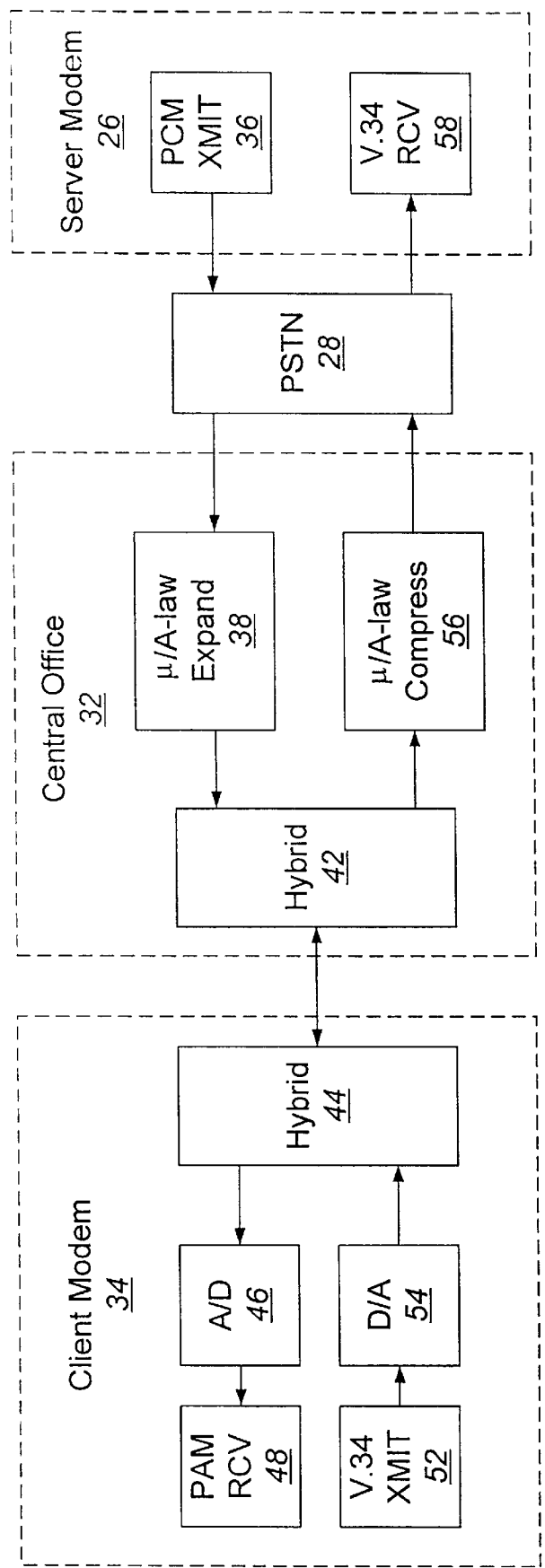
FIG. 2 is a block diagram that illustrates an internal architecture of a client modem, a central office, and a server modem shown in FIG. 1 and connections therebetween.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention may be embodied as systems, methods, or computer program products. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable program code means embodied in the medium for use by or in connection with an instruction execution system. In the context of this document, a computer-usable or computer-readable medium may be any means that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Some modules or routines, however, may be written in assembly language, machine language, or micro-code to optimize speed, memory usage, or layout of the software or firmware in memory. In a preferred embodiment, the present invention uses micro-code to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN. Furthermore, the program code for carrying out the present invention may execute on any processing system capable of performing the operations described herein.

Figure 3:
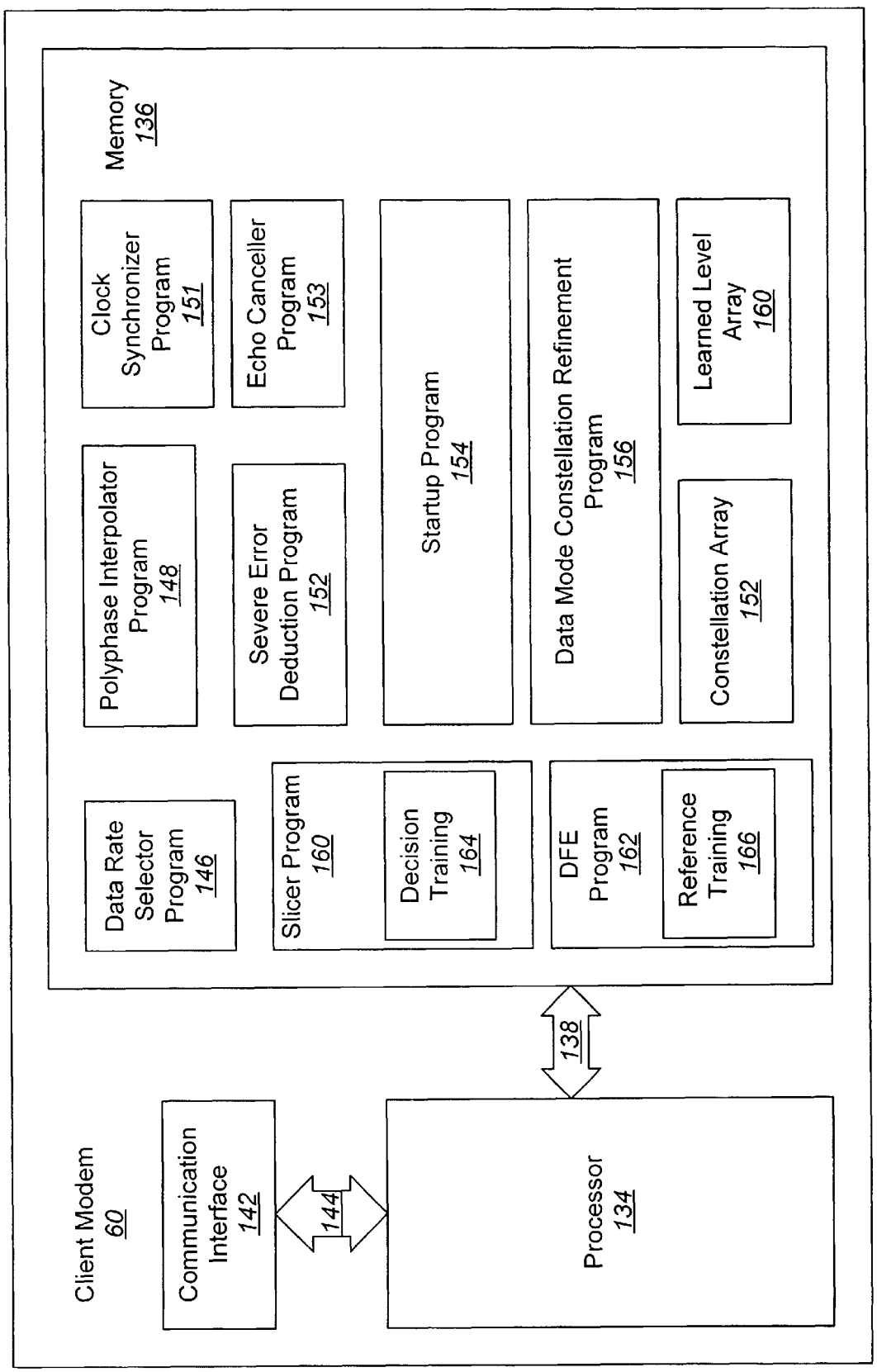
FIG. 3 is a block diagram that illustrates a client modem incorporating data mode refinement of constellation points according to the present invention.

Referring now to FIG. 3, FIG. 3 illustrates a client modem 60 incorporating data mode refinement of constellation points according to the present invention. The client modem 60 includes a processor 134, preferably a digital signal processor, which communicates with a memory 136 via an address/data bus 138. In addition, the processor 134 may receive and transmit information to external devices via a communication interface 142, which is accessed through an input/output (I/O) bus 144. The processor 134 may be any commercially available or custom processor suitable for a real-time intensive embedded application. The memory 136 is representative of the overall hierarchy of memory devices containing the software and data used to implement the functionality of the V.90 client modem 60. The memory 136 may include, but is not limited to, the following types of devices: cache, ROM, PROM, EPROM, EEPROM, flash, SRAM, and DRAM.

As shown in FIG. 3, the memory 136 can include program modules for implementing the functionality of the components of the client modem 60. Preferably, the memory 136 can include a data rate selector program module 146, a polyphase interpolator program module 148, a clock synchronizer program module 151, a severe error detector program module 152, an echo canceller program module 153, a slicer program module 160, and a Decision Feedback Equalizer (DFE) program module 162. The slicer program module 160 and the DFE program module 162 preferably include a decision training program sub-module 164 and a reference training program sub-module 166 respectively, which are used for signaling alphabet identification. Each of these program modules and sub-modules need not be described further herein for a clear understanding of the present invention.

As shown in FIG. 3, the memory 136 includes program modules for implementing the functionality for data mode refinement according to the present invention. That is, the memory 136 preferably includes a modem startup program module 154 and a data mode constellation refinement program module 156. Preferably, the client modem 60 also includes a constellation array 158 of PCM code point levels which are generated by the modem startup program module 154 and which are utilized in decoding symbols transmitted during a frame. The modem startup program module 154 preferably carries out the startup procedures described in the ITU-T V.90 modem recommendation, including, for example, phases 1 through 4 of the startup procedure. The data mode constellation refinement program module 156 preferably carries out the operations described below with reference to FIGS. 4 through 7.

After startup of the client modem 60, the constellation array 158 may be utilized to decode symbols transmitted during a frame by comparing the received signal levels to the levels in the constellation array 158 to determine the symbol transmitted. As will be appreciated by those of skill in the art, the constellation array 158 may be a plurality of linear arrays or may be a multidimensional array. The present invention refines the values in the constellation array 158 by averaging received levels for symbols received during data mode operations and then revising the values in the constellation array 158 based on the average of the received levels. Thus, the present invention may provide for refinement of the constellation points utilizing the experience of the received symbols during data mode operations.

The constellation array 158 is also preferably built from a learned level array 160 which corresponds to the learned signal levels received during a training sequence such as provided by the four phase startup sequence of the V.90 Recommendation. Operations for building a constellation from learned levels is described in commonly assigned U.S. patent application Ser. No. 09/430,694 entitled "SYSTEMS, METHODS AND COMPUTER PROGRAM PRODUCTS FOR GENERATING AND OPTIMIZING SIGNAL CONSTELLATIONS", the disclosure of which is incorporated herein by reference as if set forth fully herein.

While averaging of all received signal levels simultaneously may provide for the rapid refinement of the constellation set, such multiple concurrent averages require substantial processing resources, such as memory resources to store the multiple running averages. Thus, in a preferred embodiment of the present invention, only selected averages are determined at a given time. This allows for a trade-off between the speed with which the constellations are refined and the resources required for the refinement.

The operations of the data mode constellation refinement program module 156 according to a particular embodiment of the present invention are illustrated in FIGS. 4 through 7, utilizing the above described constellation array 158 and learned level array 160 as the input arrays. Preferably, an n by m element array (L(n,m)), where n is the number of code points utilized (i.e. up to 128 for V.90) by the modem 60 and m is the number of framing intervals (e.g. six in a V.90 modem), is provided. Also provided as input to the data mode constellation refinement program module 156 are the received signal levels and symbols associated with the received levels.

Figure 4:
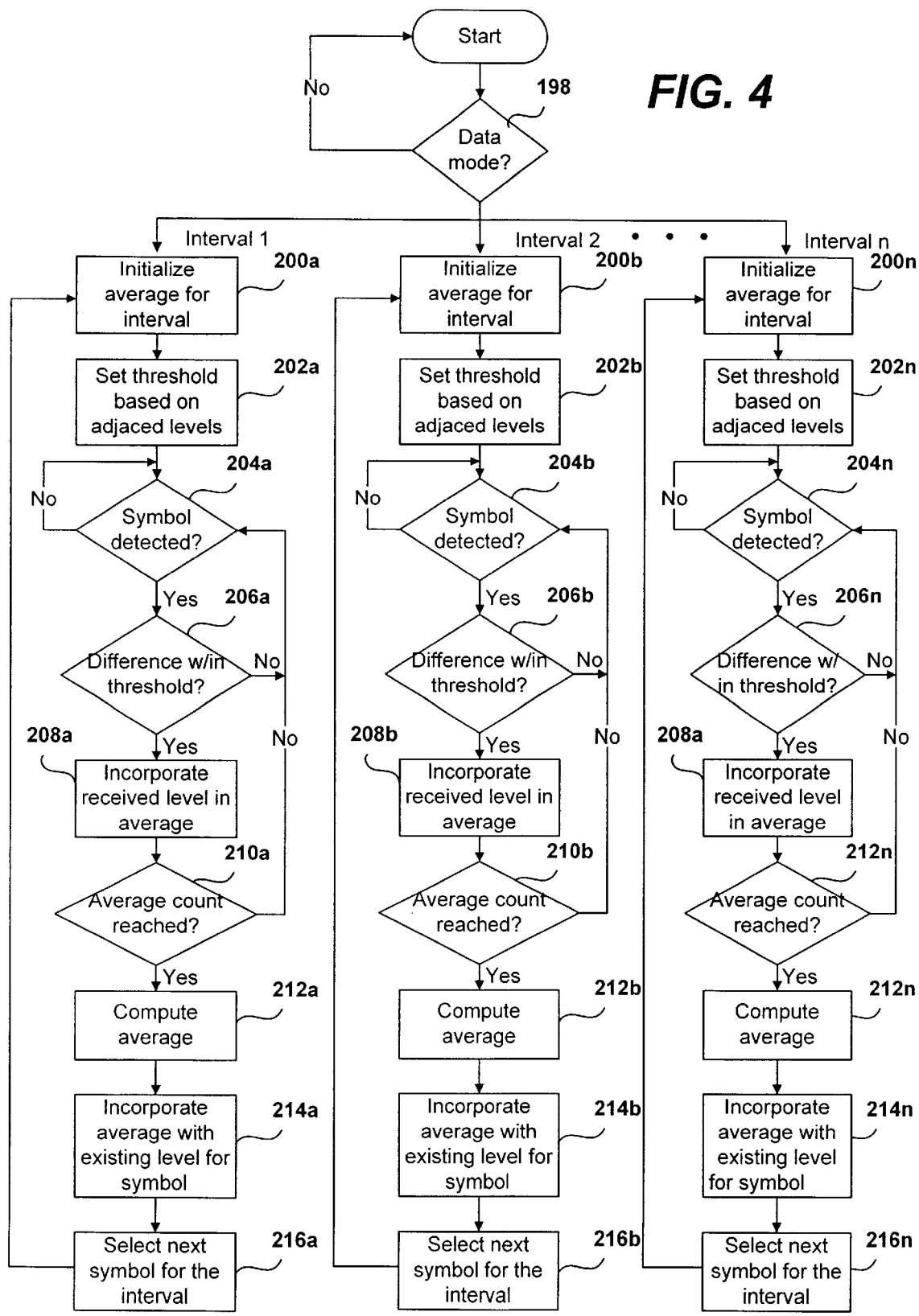
FIG. 4 is a flowchart that illustrates data mode refinement of constellation points in accordance with one embodiment of the present invention.

As seen in FIG. 4, operations according to the present invention begin by the data mode constellation refinement program module 156 determining that the modem 60 has entered data mode (i.e. exited startup) (block 198). If the modem 60 is in data mode, then for each constellation in the set of constellations utilized by the modem 60 (i.e. for each frame interval), an average is started for a particular symbol in the constellation. These operations in generating the averages for intervals 1 through n, wherein n is the number of intervals in a frame (e.g. 6 for V.90), are illustrated in FIG. 4.

As is further illustrated in FIG. 4, if the modem is in data mode, an average for each frame interval is initialized (blocks 200a, 200b . . . 200n). This initialization may take the form of establishing a 3 by 6 array of data words (e.g. three 16 bit data words for each of the six frame intervals). A first word of each column of the array may be initialized to the code point in the constellation which is to be monitored for averaging. This "code point of interest" may initially be set to the largest code point for a given interval. The remaining two words may be initialized to zero and may be used for accumulating a running sum and maintaining a count of the number of values in the running sum. Preferably, the high 7 bits of the 32 bits of the remaining words are utilized for the count and the remaining bits for the running sum. By incorporating the count and the running sum into two words, a single addition may be utilized to increment the count and the running sum.

After initialization of the averaging array, thresholds may be established based on the proximity of adjacent code points to the code point of interest (blocks 202a, 202b . . . 202n). The threshold values may, preferably, be set to ¼ the distance between signal levels associated with the code point of interest and an adjacent code point. Thus, two thresholds may be established, one for signal levels greater than the signal level associated with the code point of interest and one for signal levels less than the signal level associated with the code point of interest. As will be appreciated by those of skill in the art in light of the present disclosure, other threshold values may be utilized, furthermore a single threshold may be utilized and absolute values utilized to compare differences between received signal levels and constellation signal levels.

After initialization and threshold determination, the modem 60 waits for the symbol corresponding to the code point of interest for each interval to be received (block 204a, 204b . . . 204n). When the symbol is received, the difference between the received signal level and the signal level of the constellation is compared to the thresholds for the interval and if not within the threshold, then the signal level of the received symbol is not incorporated into the average (blocks 206a, 206b . . . 206n). Thus, signal levels with large errors may be excluded from the average so as to not incorporate the errors in the average. If, however, the difference is within the thresholds, then the received signal level is incorporated into the running average by including the received signal level in the running sum maintained in the averaging array for the appropriate interval and incrementing the count of signals included in the running sum (blocks 208a, 208b . . . 208n). The count for the running sum is then compared with a predetermined average count which determines the number of signal levels to include in an average (block 210a, 210b . . . 210n). Preferably, the average count is 64. The determination of when the count is reached may be made in the preferred embodiment by determining when the 7 bit count overflows. When the count overflows, the count has been reached. If the count for the running sum has not reached the average count, then the modem waits for the next occurrence of the symbol corresponding to the code point of interest.

If the count for the running sum has reached the average count, then the average is determined (blocks 212a, 212b . . . 212n). In the preferred embodiment, the average may be determined by a 6 bit right shift of the running sum to divide the running sum by 64. After determining the average, the average is incorporated into the constellation array 158 for the code point of interest (blocks 214a, 214b . . . 214n). This incorporation preferably is performed by averaging the newly obtained average with the value in the constellation array 158 and replacing the value in the constellation array 158 with this new average. The average may be incorporated with the value in the constellation array 158 by summing the average and the value in the constellation array and then dividing by 2. Alternatively, a weighted average could be computed to weight the average of the old value in the constellation array 158 and the average. Thus, the incorporation of the average into the constellation array 158 may be expressed as New Level=(X*Old Level+Y*Average) where X and Y are weight factors which are preferably equal to 0.5. Furthermore, the New Level may be incorporated into the constellation array 158 by setting the New Level to a sign opposite that of the values in the constellation array 158 which have not been refined. As described below, by changing the sign of the New Level, the values in the constellation array 158 which have been refined may be identified.

After incorporating the average into the constellation array 158, a new code point of interest is selected (blocks 216a, 216b . . . 216n). The new code point of interest may be selected by selecting the next lower code point in the constellation from the current code point of interest. When the current code point is the lowest code point, the largest code point may then be selected as the new code point of interest. After selecting a new code point of interest, averaging operations begin again at blocks 200a, 200b . . . 200n for the new code point of interest.

FIG. 5 illustrates further aspects of the present invention which addresses the issue of "dead spots" in a constellation (i.e. symbols which are not used or are infrequently used for an interval). As discussed above, dead spots may result from the use of modulous encoding and typically occur in the final frame interval. As seen in FIG. 5, when an interval reaches the average count (block 300 in FIG. 5 and blocks 210a, 210b . . . 210n in FIG. 4), the count for another interval, preferably the last interval in the frame, is examined to determine if it is above a threshold value (block 302). While this threshold value may be any value not above the average count, it is preferred that it be determined if the count is zero. If the count is less than the threshold, then a new code point of interest is selected for the other interval and averaging restarted with the new code point of interest (block 304). The operations of FIG. 5 are, preferably, carried out when the average count is reached for interval n-1, however, the operations may be carried out when any of the intervals reach their average count. Thus, the operations of FIG. 5 may account for dead spots by changing the code point of interest if no symbols corresponding to the code point are received by the modem 60 or are only received infrequently.

Figure 7:
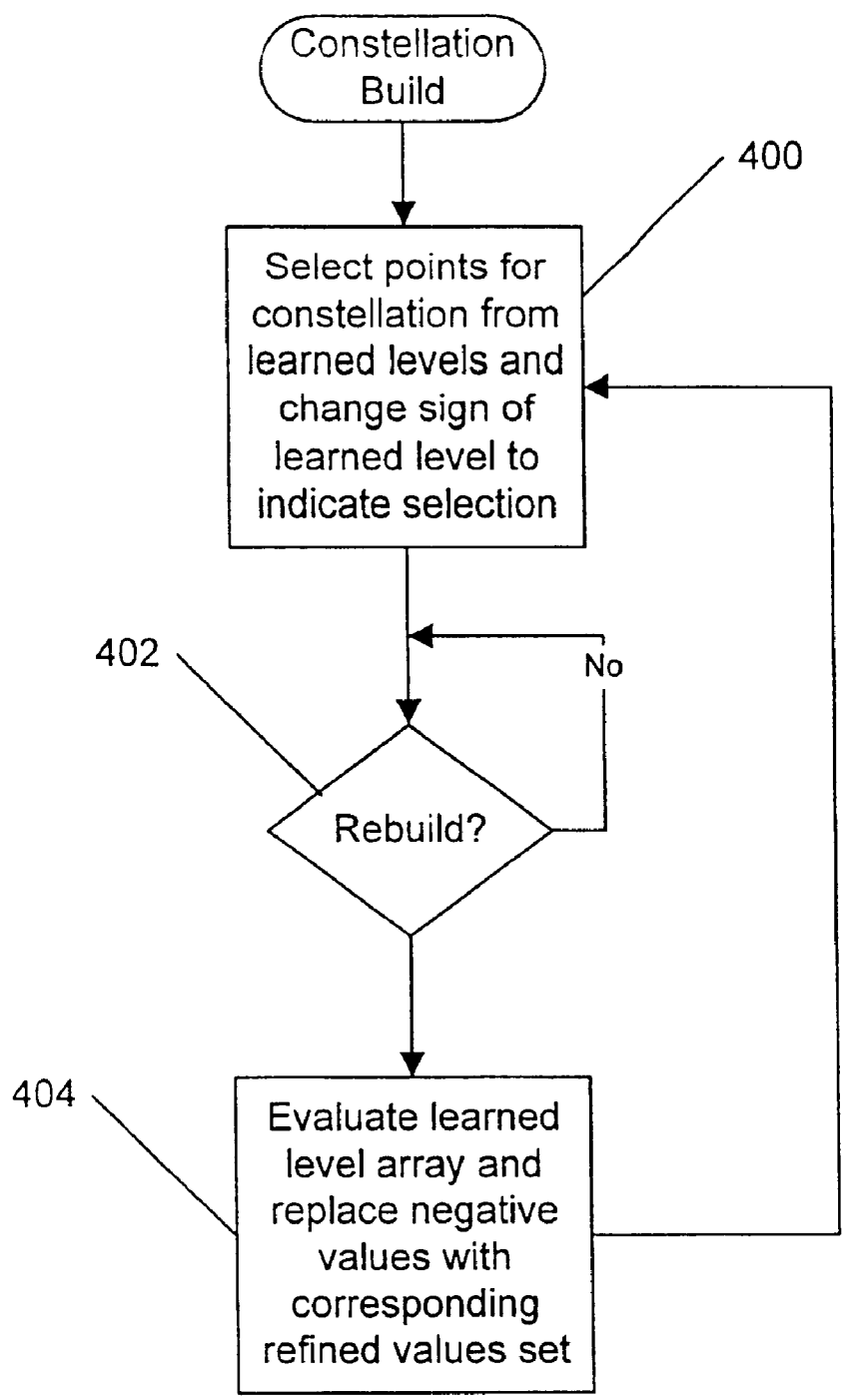
FIG. 7 is a flowchart illustrating additional aspects of an embodiment of the present invention.

Because constellations refined as discussed above may provide improved performance over the learned constellations resulting from startup, it may be beneficial to preserve the refined constellation values even if a data rate change is requested. Operations for preserving the refined constellation values in the presence of a requested data rate change are illustrated in FIGS. 6 and 7. Thus, as seen in FIG. 6, if modem 60 receives a data rate change request (block 310), modem 60 determines if a change of data rate has been requested by the client modem 60 (block 312). If the data rate change request was not received from the client modem 60, then the constellation is not rebuilt. However, if the client modem requests a data rate change, then the constellation is rebuilt (block 314).

FIG. 7 illustrates operations according to a further aspects of the present invention. As seen in FIG. 7, when the constellation array 158 is built from the learned level array 160, if a learned level is incorporated into the constellation, then the sign of the learned level is set to negative in the learned level array 160 (block 400). The constellation values in the constellation array 158 may then be refined as described above. In order to not lose these refinements if the constellation is rebuilt, for example, in response to a data rate change, the refined levels are incorporated back into the learned level array 160. As seen in FIG. 7, this may be accomplished by refining the levels until a rebuild of the constellation is required (block 402). However, prior to rebuilding the constellation array 158, the refined levels are written back to the learned level array 160 by evaluating the learned level array for negative values and then replacing the negative values with the corresponding refined values from the constellation array 158. The refined values would be placed as positive values in the learned level array 160. Furthermore, the replacement of values in the learned level array 160 may be achieved by locating the first negative value in the learned level array 160 and replacing it with the first value in the constellation array 158. The next negative value would then be located in the learned level array 160 and this value replaced with the next value in the constellation array 158. This process would continue until all of the negative values had been replaced in the learned level array 160 with the corresponding refined values from the constellation array 158.

After incorporation of the refined values in the learned level array 160, the constellation may be rebuilt in the manner in which it was originally built (block 400) but with the inclusion of the new refined values in the constellation. Thus, through the use of the sign of the value in the learned level array 160, the status of a value in the learned level array 160 as to whether it is included in the constellation array 158 or not may be identified.

The present invention has been described herein with reference to flowchart and/or block diagram illustrations of methods, apparatus (systems), and computer program products according to an embodiment of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In one embodiment of the present invention, proximity averaging may be implemented in assembly language code. The assembly language code may take the form of the following code.

```
;start of change for learning constellation levels during data mode;
                          r1=r1+r1          ;double for indexing
r3=P_cnt(r0)                                ;r3=P_cnt
r4=ptrx2ds(r0)                              ;r4=ptr to X2 data
r0=systmp1                                  ;r0=ptr to Tx levels
                                            ;x2213
r4=#start_6T(r4)                            ;r4=ptr to 6T block
                          r0=r0+r1          ;r0=ptr->Tx level
                                            [2*Msym index]
                          r3=r3+r3              ;r1=2*P_cnt
r2=0(r0)                  r4=r4+r3          ;r2=quantized
                                            TRN18 mu-law level
                          r1=Ir1I/2         ;scaling for storing
                                            Msym
r7=(10*6*2) (r4)                            ;modparam from build
                                            6T array
;used as current point for averaging in data mode
   r5=0(r0)               r1-r7             ;is current decision the
                                            point to be averaged?
bne skip_average                            ;
;b skip average                             ;
Msym(r4)=r1               r1=r1+r1          ;save index to final
                                            decision into Msym
                          r2=r2-r21         ;difference between
                                            actual and ideal
r6=(2*maxMsize) (r0) r2=|r2|                ;r6=corresponding
                                            threshold
                          r6=r6-r5          ;difference between
                                            threshold and ideal
                          r2=r2+r2          ;double actual error
                          r6-r2             ;compare with distance
                                            to threshold
bn skip average                             ;skip average if large
                                            error
r6=(11*6*2) (r4)                            ;high word of current
                                            average
r61=(12*6*2) (r4)                           ;low word of current
                                            average
r2=#0x0200                                  ;loop increment
                          wr6=wr6+wr2       ;accumulate average
                                            (loop cnt in high 7 bits)
bnn save_average
                          %wr2              ;clear out Zr
r2=#0x0200                                  ;loop increment
                          wr6=wr6-wr2       ;remove last loop incr
                                            to make it positive again
                          wr6=Iwr6I*2**10   ;scale for number of
                                            samples in average
```

-continued

```
                    r5=r5+r6              ;combine average with
                                           current level
                    r5=|r5|/2             ; renormalize
 0(r0)=r5                                 ;save updated level
;now, the two adjacent thresholds must be updated
    r2=2(r0)        r6=r6^~r6             ;next lower level
                    r2=r2+r5
                    r2=|r2|/2             ;new threshold
 (2*maxNsize + 2) (r0)=r2   r7            ;save in threshold array
 r2=-2(r0)                                ;next higher level
 bz set_current_codept                    ;skip reinit of
                                           codepointer
 r7=modParam(r4)    r2=r2+r5
                    r2=|r2|/2             ;new threshold
    (2*maxMsize) (r0)=r2                  ;save in threshold array
 r7=(10*6*2) (r4)                         ;modparam from build
                                           6T array
 set_current_codept   equ ·
                    r7=r7+r6              ;decr codepoint
 (10*6*2) (r4)=r7                         ;modparam from
                                           build_6T array
 r7=#2*4
                    r7-r3                 ;check if interval 4
 bnz save_average                         ;if not, don't worry
                                           about interval 5
                    %wr 6
 r7=(11*6*2+2) (r4)                       ;high word of average
                                           for interval 5
                    r7
 bnz save_average   r1=r1^~r1
 r7=(10*6*2+2) (r4)                       ;modparam from
                                           build_6T for interval 5
                    r1=r1+r7              ;decrement ptr for
                                           interval 5 to avoid
                                           ;dead point in
                                           constellation for
                                           ;interval 5 due to
                                           modulus encoding
 bn save_average                          ;don't save it if negative
                    nop
    (10*6*2+2) (r4)=r1                    ;save updated pointer
                                           for interval 5
 save_average equ ·
    (11*6*2) (r4)=r6                      ;save high word of
                                           current average
    (12*6*2) (r4)=r61                     ;save low word of
                                           current average
 skip_average equ ·
 r0=systmp4                               ;r0=ptr to V.32 data
 r6=#2*5            r2=r5                 ;r6=threshold;
 r5=rar (r0)                              ;r3=final decision level
                    r5                    ;Test sign of rar
 bnn_save_txsym                           ;b if rar is non-negative
 r0=systmp3                               ;r0=ptr to V.34 data
                                           ;x2213
;------------------------------------------------------------;
                    r2=-r2                ; rar -ve,
                                           change sign of level
;end of change for learning constellation levels during data mode;
```

The flowcharts of FIGS. 4 through 7 illustrate the architecture, functionality, and operation of a possible implementations of the client modem receiver software. In this regard, each block represents a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the fuinctionality involved.

While the present invention has been illustrated and described in detail in the drawings and foregoing description, it is understood that the embodiments shown are merely exemplary. Moreover, it is understood that many variations and modifications can be made to the embodiments described hereinabove without substantially departing from the principles of the present invention. All such variations and modifications are intended to be included herein within the scope of the present invention, as set forth in the following claims.

That which is claimed is:

1. A. method of refining constellation values in a Pulse Code Modulated (PCM) code point sequence of a PCM modem, the method comprising:

averaging received levels associated with a plurality of symbols for a code point of interest received during data mode operation of the PCM modem so as to provide an average received level for the code point of interest; and revising a constellation value corresponding to the code point of interest in the PCM code sequence based on the average received level for the code point of interest so as to provide a refined constellation value.

2. A method according to claim 1, wherein the step of averaging comprises the steps of:

detecting that a symbol corresponding to the code point of interest has been received by the PCM modem;

incorporating the received level of the symbol into a running sum of previously received levels for the symbol;

determining if a predefined number of received levels have been incorporated into the running sum; and dividing the running sum by the predefined number of received levels if the predefined number of received levels have been incorporated in the running sum.

3. A method according to claim 2, wherein the step of dividing is followed by the steps of:

resetting the running sum to zero; and selecting a new code point as the code point of interest.

4. A method according to claim 2, wherein the step of incorporating is preceded by the step of determining if the received level of the symbol deviates from the constellation value associated with the code point of interest by less than a predefined threshold and wherein the step of incorporating the received level of the symbol into the running sum of previously received levels for the symbol incorporates the received level into the running sum if the received level of the symbol deviates from the constellation value associated with the code point of interest by less than the predefined threshold.

5. A method according to claim 4, wherein the predefined threshold is about ¼ the value of a distance between the code point of interest and an adjacent code point in the PCM code point sequence.

6. A method according to claim 1, wherein the PCM code point sequence comprises a plurality of PCM code point sequences associated with a plurality of framing intervals and wherein the steps of averaging and replacing are carried out for a code point of interest in each of the plurality of framing intervals.

7. A method according to claim 6, further comprising the steps of:

determining if a count of received levels associated with a running average of a first interval is not greater than a minimum threshold when a count from a second interval has reached the predefined number of received levels; and selecting a new code point as the code point of interest for the first interval if the count of received levels associated with the running average of the first interval is not greater than the minimum threshold.

8. A method according to claim 7, wherein the minimum threshold is zero.

9. A method according to claim 1, wherein the step of revising a constellation value corresponding to the code point of interest in the PCM code sequence so as to provide a refined constellation value comprises the steps of:
  averaging the constellation value corresponding to the code point of interest with the average received level; and
  replacing the constellation value with the average of the constellation value and the average received level.

10. A method according to claim 1 further comprising the steps of:
  identifying learned levels associated with the constellation values; and
  replacing the learned levels associated with the constellation values with refined constellation values prior to rebuilding of the constellation values.

11. A method according to claim 10, wherein the learned levels are stored as values in an array, and wherein the step of identifying comprises the step of storing the learned levels in the array so as to indicate that the value stored in the array is incorporated in the constellation values in the PCM code point sequence of the PCM modem.

12. A method according to claim 11, wherein the step of storing comprises the step of storing the learned levels in the array so as to have a sign opposite to that of learned levels in the array which are not incorporated in the constellation values.

13. A method according to claim 12, wherein the sign of the learned levels incorporated in the constellation values is negative.

14. A method according to claim 1, wherein the constellation values are constellation values for a client modem, the method further comprising the step of rebuilding constellation values so as to provide the initial set of constellation values in response to a data rate reduction request only if the client modem requests a data rate change.

15. A system for refining constellation values in a Pulse Code Modulated (PCM) code point sequence of a PCM modem, comprising:
  means for averaging received levels associated with a plurality of symbols for a code point of interest received during data mode operation of the PCM modem so as to provide an average received level for the code point of interest; and
  means for revising a constellation value corresponding to the code point of interest in the PCM code sequence based on the average received level for the code point of interest so as to provide a refined constellation value.

16. A system according to claim 15, wherein the means for averaging comprises:
  means for detecting that a symbol corresponding to the code point of interest has been received by the PCM modem;
  means for incorporating the received level of the symbol into a running sum of previously received levels for the symbol;
  means for determining if a predefined number of received levels have been incorporated into the running sum; and
  means for dividing the running sum by the predefined number of received levels if the predefined number of received levels have been incorporated in the running sum.

17. A system according to claim 16, further comprising:
  means for resetting the running sum to zero; and
  means for selecting a new code point as the code point of interest.

18. A system according to claim 16, further comprising means for determining if the received level of the symbol deviates from the constellation value associated with the code point of interest by less than a predefined threshold and wherein the means for incorporating the received level of the symbol into the running sum of previously received levels for the symbol incorporates the received level into the running sum if the received level of the symbol deviates from the constellation value associated with the code point of interest by less than the predefined threshold.

19. A system according to claim 18, wherein the predefined threshold is about ¼ the value of a distance between the code point of interest and an adjacent code point in the PCM code point sequence.

20. A system according to claim 15, wherein the PCM code point sequence comprises a plurality of PCM code point sequences associated with a plurality of framing intervals and wherein the means for averaging averages measured levels for a code point of interest in each of the plurality of framing intervals and the means for replacing replaces the values corresponding to the code point of interest for the corresponding PCM code point sequence.

21. A system according to claim 20, further comprising:
  means for determining if a count of received levels associated with a running average of a first interval is not greater than a minimum threshold when a count from a second interval has reached the predefined number of received levels; and
  means for selecting a new code point as the code point of interest for the first interval if the count of received levels associated with the running average of the first interval is not greater than the minimum threshold.

22. A system according to claim 21, wherein the minimum threshold is zero.

23. A system according to claim 15, wherein the means for revising a constellation value corresponding to the code point of interest in the PCM code sequence so as to provide a refined constellation value comprises:
  means for averaging the constellation value corresponding to the code point of interest with the average received level; and
  means for replacing the constellation value with the average of the constellation value and the average received level.

24. A system according to claim 15 further comprising:
  means for identifying learned levels associated with the constellation values; and
  means for replacing the learned levels associated with the constellation values with refined constellation values prior to rebuilding of the constellation values.

25. A system according to claim 24, wherein the learned levels are stored as values in an array, and wherein the means for identifying comprises means for storing the learned levels in the array so as to indicate that the value stored in the array is incorporated in the constellation values in the PCM code point sequence of the PCM modem.

26. A system according to claim 25, wherein the means for storing comprises means for storing the learned levels in the array so as to have a sign opposite to that of learned levels in the array which are not incorporated in the constellation values.

27. A system according to claim 26, wherein the sign of the learned levels incorporated in the constellation values is negative.

28. A system according to claim 15, wherein the constellation values are constellation values for a client modem, further comprising means for rebuilding constellation values so as to provide the initial set of constellation values in response to a data rate reduction request only if the client modem requests a data rate change.

29. A computer program product for refining constellation values in a Pulse Code Modulated (PCM) code point sequence of a PCM modem, comprising:

a computer-readable storage medium having computer readable program code embodied in said medium, said computer-readable program code comprising:

computer readable program code for averaging received levels associated with a plurality of symbols for a code point of interest received during data mode operation of the PCM modem so as to provide an average received level for the code point of interest; and computer readable program code for revising a constellation value corresponding to the code point of interest in the PCM code sequence based on the average received level for the code point of interest so as to provide a refined constellation value.

30. A computer program product according to claim 29, wherein the computer readable program code for averaging comprises:

computer readable program code for detecting that a symbol corresponding to the code point of interest has been received by the PCM modem;

computer readable program code for incorporating the received level of the symbol into a running sum of previously received levels for the symbol;

computer readable program code for determining if a predefined number of received levels have been incorporated into the running sum; and computer readable program code for dividing the running sum by the predefined number of received levels if the predefined number of received levels have been incorporated in the running sum.

31. A computer program product according to claim 30, further comprising:

computer readable program code for resetting the running sum to zero; and computer readable program code for selecting a new code point as the code point of interest.

32. A computer program product according to claim 30, fuirther comprising computer readable program code for determining if the received level of the symbol deviates from the constellation value associated with the code point of interest by less than a predefined threshold and wherein the computer readable program code for incorporating the received level of the symbol into the running sum of previously received levels for the symbol incorporates the received level into the running sum if the received level of the symbol deviates from the constellation value associated with the code point of interest by less than the predefined threshold.

33. A computer program product according to claim 32, wherein the predefined threshold is about ¼ the value of a distance between the code point of interest and an adjacent code point in the PCM code point sequence.

34. A computer program product according to claim 29, wherein the PCM code point sequence comprises a plurality of PCM code point sequences associated with a plurality of framing intervals and wherein the computer readable program code for averaging averages measured levels for a code point of interest in each of the plurality of framing intervals and the computer readable program code for replacing replaces the values corresponding to the code point of interest for the corresponding PCM code point sequence.

35. A computer program product according to claim 34, further comprising:

computer readable program code for determining if a count of received levels associated with a running average of a first interval is not greater than a minimum threshold when a count from a second interval has reached the predefined number of received levels; and computer readable program code for selecting a new code point as the code point of interest for the first interval if the count of received levels associated with the running average of the first interval is not greater than the minimum threshold.

36. A computer program product according to claim 35, wherein the minimum threshold is zero.

37. A computer program product according to claim 29, wherein the computer readable program code for revising a constellation value corresponding to the code point of interest in the PCM code sequence so as to provide a refined constellation value comprises:

computer readable program code for averaging the constellation value corresponding to the code point of interest with the average received level; and computer readable program code for replacing the constellation value with the average of the constellation value and the average received level.

38. A computer program product according to claim 29 firther comprising:

computer readable program code for identifying learned levels associated with the constellation values; and computer readable program code for replacing the learned levels associated with the constellation values with refined constellation values prior to rebuilding of the constellation values.

39. A computer program product according to claim 38, wherein the learned levels are stored as values in an array, and wherein the computer readable program code for identifying comprises computer readable program code for storing the learned levels in the array so as to indicate that the value stored in the array is incorporated in the constellation values in the PCM code point sequence of the PCM modem.

40. A computer program product according to claim 39, wherein the computer readable program code for storing comprises computer readable program code for storing the learned levels in the array so as to have a sign opposite to that of learned levels in the array which are not incorporated in the constellation values.

41. A computer program product according to claim 40, wherein the sign of the learned levels incorporated in the constellation values is negative.

42. A computer program product according to claim 29, wherein the constellation values are constellation values for a client modem, fuirther comprising computer readable program code for rebuilding constellation values so as to provide the initial set of constellation values in response to a data rate reduction request only if the client modem requests a data rate change.

* * * * *